United States Patent [19]

Ito et al.

[11] Patent Number: 5,564,013
[45] Date of Patent: Oct. 8, 1996

[54] OPTICAL INFORMATION RECORDING AND REPRODUCING APPARATUS ADAPTED TO OPTICALLY RECORD AND REPRODUCE DATA IN A SECTOR, AND METHOD THEREOF

[75] Inventors: Motoshi Ito, Moriguchi; Kazuhiro Aoki, Suita; Yoshihisa Fukushima, Osaka, all of Japan

[73] Assignee: Matsushita Electric Industrial Co., Ltd., Osaka, Japan

[21] Appl. No.: 558,466

[22] Filed: Nov. 16, 1995

Related U.S. Application Data

[63] Continuation of Ser. No. 81,016, Jun. 22, 1993, abandoned.

[30] Foreign Application Priority Data

Jun. 22, 1992 [JP] Japan .................................. 4-161547

[51] Int. Cl.[6] .................................................. G06F 11/00
[52] U.S. Cl. .................... 395/182.13; 369/44.32
[58] Field of Search ............................ 395/182.13, 410;
371/40.1; 369/43, 44.32, 44.11, 44.12, 44.13,
44.14, 44.15, 44.26, 44.42, 53, 27, 275.9,
132; 360/75, 76

[56] References Cited

U.S. PATENT DOCUMENTS

| 4,562,577 | 12/1985 | Glover et al. ........................... 371/38 |
|---|---|---|
| 4,571,716 | 2/1986 | Szerlip ................................... 369/54 |
| 4,633,471 | 12/1986 | Perera et al. ........................... 371/38 |
| 4,774,700 | 9/1988 | Satoh et al. ............................. 369/54 |
| 4,788,685 | 11/1988 | Sako et al. .............................. 371/38 |
| 4,800,548 | 1/1989 | Koishi et al. ............................ 369/54 |
| 4,821,254 | 4/1989 | Satoh et al. ............................. 369/54 |
| 4,881,232 | 11/1989 | Sako et al. ........................... 371/37.4 |
| 4,937,804 | 6/1990 | Ishihara ................................... 369/48 |
| 4,984,230 | 1/1991 | Satoh et al. ............................. 369/54 |
| 4,998,233 | 3/1991 | DiMatteo et al. .................... 369/44.25 |
| 5,048,002 | 9/1991 | Horie et al. .......................... 369/44.35 |
| 5,109,385 | 4/1992 | Karp et al. ............................... 371/42 |
| 5,136,569 | 8/1992 | Fennema et al. ......................... 369/58 |
| 5,220,543 | 6/1993 | Kuroda et al. ........................... 369/13 |
| 5,233,584 | 8/1993 | Kulakowski et al. ............... 369/44.27 |
| 5,396,477 | 3/1995 | Matsumoto et al. ................. 369/44.28 |

*Primary Examiner*—Robert W. Beausoliel, Jr.
*Assistant Examiner*—Stephen C. Elmore
*Attorney, Agent, or Firm*—Ratner & Prestia

[57] ABSTRACT

An optical information recording and reproducing apparatus, and a method thereof which reproduces and records data on a sector on an optical disk. The optical information recording and reproducing apparatus is connected to a host computer. The apparatus includes a normal reproducing component for reproducing the data recorded on the information recording medium under normal reproducing conditions, and a verification, reproducing component for reproducing data recorded on the information recording medium under stricter reproducing conditions than the normal reproducing conditions. Also included is a reproduction controlling component for controlling the normal reproducing component and the verifying reproducing component to perform a reproducing operation from the same sector at the same time from the optical disk, and a recovery reporting component for reporting to the host computer when either the normal reproducing component or the verifying, reproducing component can not reproduce the data correctly.

25 Claims, 10 Drawing Sheets

(a) disk cross-section
(b) TE signal >0 =0

(a) information recording medium
(b) output of optical head 7

OPTICAL INFORMATION RECORDING AND REPRODUCING APPARATUS ADAPTED TO OPTICALLY RECORD AND REPRODUCE DATA IN A SECTOR, AND METHOD THEREOF

This application is a continuation of application Ser. No. 08/081,016 filed Jun. 22, 1993, now abandoned.

BACKGROUND OF THE INVENTION

The present invention generally relates to an optical information recording and reproducing apparatus, and a method thereof for optically recording and reproducing operations information using an information recording medium divided into a sector unit of a fixed length.

In recent years, the use of information recording and reproducing apparatuses using information recording mediums for exchanging large amounts of information has spread. An optical disc apparatus records and reproduce information using extremely small pits on the optical disc with the use of laser light beams. As the amount of information to be recorded on one information recording medium increases, it becomes difficult to improve the reliability of data to be recorded on the information recording medium. Presently, when the quality of the data has deteriorated among the data recorded on the information recording medium, it is difficult to correctly reproduce the information. It is significant to be able to reliably detect data which possibly cannot be reproduced in the near future and to move the data into another region of the information recording medium while the reproducing operation can be correctly performed.

The conventional optical information recording and reproducing apparatus was provided with separate normal reproduction and verification reproduction. Assume that a small computer system interface (hereinafter referred to as SCSI) was provided on, for example, a host interface, and the respective reproducing operations were effected by the reception of a READ command for normal reproduction from the host computer and a VERIFY command for reproduction of the verification. The normal reproducing operation is used to reproduce data as correctly as possible even if the data to be recorded on the information recording medium has deteriorated. Factors causing deterioration of data include smaller signal amplitude, more noise components because of aging deterioration of the information recording medium, flaws, dust on the surfaces of the information recording medium, and non-optimum recording conditions. In the conventional optical information recording and reproducing apparatus, when reproducing conditions are not influenced by the deterioration of the data, the decision of whether the analog signal is a 0 or 1 was set as 50% of the data amplification in the slice level and the error correcting function was set to maximum. The verification reproducing operation guarantees the normal reproducing operation even if data recorded on the information recording medium has deteriorated. In the conventional optical information recording and reproducing apparatus, data likely to deteriorate was selected for verification reproduction. The decision of whether the analog signal is a 0 or 1 was set at 60% in the data amplification for the slice level and the error correcting function as one of the reproducing conditions to be likely influenced due to the deterioration of data was reduced to half of what is used in the normal reproducing conditions as the reproducing conditions to be likely to be influenced in the deterioration of the data.

The host computer is required to effect the following operation to detect the data which possibly can no longer be reproduced in the near future using the above described function provided with the conventional optical information recording and reproducing apparatus.

The host computer 1 issues a verification reproduction instruction (VERIFY command of the SCSI) with respect to a sector having recorded information. Data which possibly cannot be reproduced in the near future from the optical information recording and reproducing apparatus 2 can be detected, using verification by receiving the report that the reproduction verification is not effected. Then, a normal reproduction instruction (READ command of the SCSI) is issued and data which possibly can not be reproduced in the near future is retrieved. In order to rewrite the data on the information recording medium, the recording instruction (WRITE command of the SCSI or WRITE AND VERIFY command) is issued.

In order to detect data which possibly can not be reproduced in the near future, and to move the data to another region of the information recording medium during the correct reproducing operation, the conventional optical information recording and reproducing apparatus has to use both the reproduction instruction intended to verify and a reproduction instruction intended to reproduce the data.

As a result, the burden of the host computer increases and the processing time increases which lowers performance. Tracking and focusing cannot be shifted deliberately in verification reproduction. Because tracking and focusing cannot be shifted deliberately in the reproduction for verification, there is a problem of failing to detect a sector which will possibly deteriorate to a degree having little possibility of being correctly reproduced in the near future.

SUMMARY OF THE INVENTION

Accordingly, the present invention has been developed with a view to substantially eliminate the above discussed drawbacks inherent in the prior art and has for its essential object to provide an improved optical information recording and reproducing apparatus.

Another important object of the present invention is to provide an optical formation recording and reproducing apparatus having improved reliability by the efficient detection of a sector which possibly cannot be reproduced in in the near future, easier reporting of it to the host computer, and to an optical information recording and reproducing method.

In accomplishing these and other objects, according to one preferred embodiment of the present invention, there is provided an optical information recording and reproducing apparatus, and a method thereof, which are connected with a host computer to optically record, reproduce the data on a sector unit with the use of the information recording medium. The apparatus includes a normal reproducing means for reproducing the data recorded on the information recording medium, verifying, reproducing means for reproducing data recorded on the information recording medium using stricter reproducing conditions than in the normal reproducing conditions, a reproduction controlling means for getting the above described normal reproducing means and the above described verifying reproducing means to perform the reproducing operation on the same sector at the same time, a recovery reporting means for reporting the recovered operation to the host computer when either of the above described normal reproducing means and the above described verifying, reproducing means cannot reproduce the data correctly.

The reproducing means for verification performs reproduction verification under conditions including: the maximum of the error correcting byte number is strictly limited; the detecting condition of the sector is made strict; the amount of the wave form correction is shifted from the proper value to a certain value; the slice level for binarization of an analog signal including two values of 0 or 1 is shifted from the proper value to a certain value; and the amplification factor is shifted from the proper value to a certain value.

The present invention is an optical information recording and reproducing apparatus, and a method thereof. The apparatus is connected to a host computer so as to optically record, reproduce the data on a sector unit with the use of the information recording medium. The apparatus comprises a normal reproducing means for reproducing the data recorded on the information recording medium, a verifying, reproducing means for effecting a reproducing operation with stricter reproducing conditions than the normal reproducing means, a reproducing, controlling means for having the (1) above described verifying, reproducing means perform the reproducing operation for a first time in each sector, and (2) the above described normal reproducing means perform the reproducing operation in the second and subsequent operations of the same sector when the reproducing operation has failed, and a recovery reporting means for reporting the recovered operation to the host computer when the data is correctly reproduced by the above described normal reproducing, controlling means.

The verifying, reproducing means, for reproducing conditions, makes the top limit of the error correcting byte number stricter, the detecting conditions of the sector stricter, the wave form correcting amount slide from the proper value, the slice level of the analog signal into 0 or 1 slide from the proper value, and the amplification factor slide from the proper value.

The present invention is an optical information recording and reproducing apparatus, and a method thereof, for optically recording, reproducing data in a sector unit with the use of a information recording medium. The apparatus comprises a tracking servo means which can adjust the off-track amount that is the slip amount from the center of the track, and a verifying, reproducing means for controlling the off-track amount of off-tracking when reproducing to verify the recorded data.

The present invention is an optical information recording, reproducing apparatus, and a method thereof, for optically recording, reproducing data on the sector unit using an information recording medium, a focusing servo means which can adjust the defocus amount which is a slip amount of a focus with respect to the recording face of the information recording medium, and a verifying, reproducing means for controlling the defocus amount when verifying the recorded data.

The present invention is an optical information recording and reproducing apparatus, and a method thereof, connected with a host computer to optically record, reproduce data on a sector unit with the use of the information recording medium. The apparatus comprises a tracking servo means capable of adjusting the off-track amount which is a shift amount from the center of the track, a normal reproducing means which controls the off-track amount and reproduces the data without off-tracking, a verifying, reproducing means which controls the off-track amount to reproduce the data using an off-track, a reproducing, controlling means for having the above described verifying, reproducing means perform the reproducing operation for a first time for each sector, having the above described normal reproducing means effect the reproducing operation for a second and subsequent times for the same sector when the reproducing operation has failed, and a recovery reporting means for reporting the recovered operation to the host computer when the data could be reproduced normally by the above described normal reproducing, controlling means.

The present invention is an optical information recording and reproducing apparatus, and a method thereof, which are connected with a host computer to optically record, reproduce data on a sector unit with the use of the information recording medium. The apparatus comprises a focusing servo means capable of adjusting the defocus amount which is a shift amount of the focus with respect to the recording face of the information recording medium, a normal reproducing means which controls the defocus amount and reproduces the data without defocusing it, a verifying, reproducing means which controls the defocus amount to shift defocus when reproducing the data, a reproducing, controlling means for having the above described verifying, reproducing means perform the reproducing operation for a first time for each sector and the above described normal reproducing means effect the reproducing operation for a second and subsequent times for the same sector, and a recovery reporting means for reporting the recovered operation to the host computer when the data could be reproduced normally by the above described normal reproducing, controlling means.

The optical information recording and reproducing apparatus of the present invention, and a method thereof can perform a reproducing operation using two reproducing conditions or more at the same time by the above described construction.

When the reproducing operation can be normally performed using one of the reproducing conditions, the correctly reproduced data can be forwarded to the host computer to report the recovered operation to the host computer. Thus, the existence of the sector which possible can not be reproduced in the near future can be reported to the host computer with ease.

The optical information recording and reproducing apparatus, and a method thereof of the present invention is set with stricter reproducing conditions than normal when reproducing a respective sector for a first time. The reproducing operation is performed using the normal reproducing conditions for second and subsequent times of the same sector when a failing operation has been performed in a first reproducing operation. When the data can be correctly reproduced with the normal reproducing conditions for a second and subsequent times of the same sector, the recovered operation is reported to the host computer. The existence of the sector which possibly cannot be reproduced in the near future can be easily reported to the host computer.

The optical information recording and reproducing apparatus of the present invention, and a method thereof, can adjust the off-track amount and the defocus amount. The tracking and focusing operations can be deliberately adjusted and the sector which possibly cannot be reproduced in the near future can be detected with efficiency.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
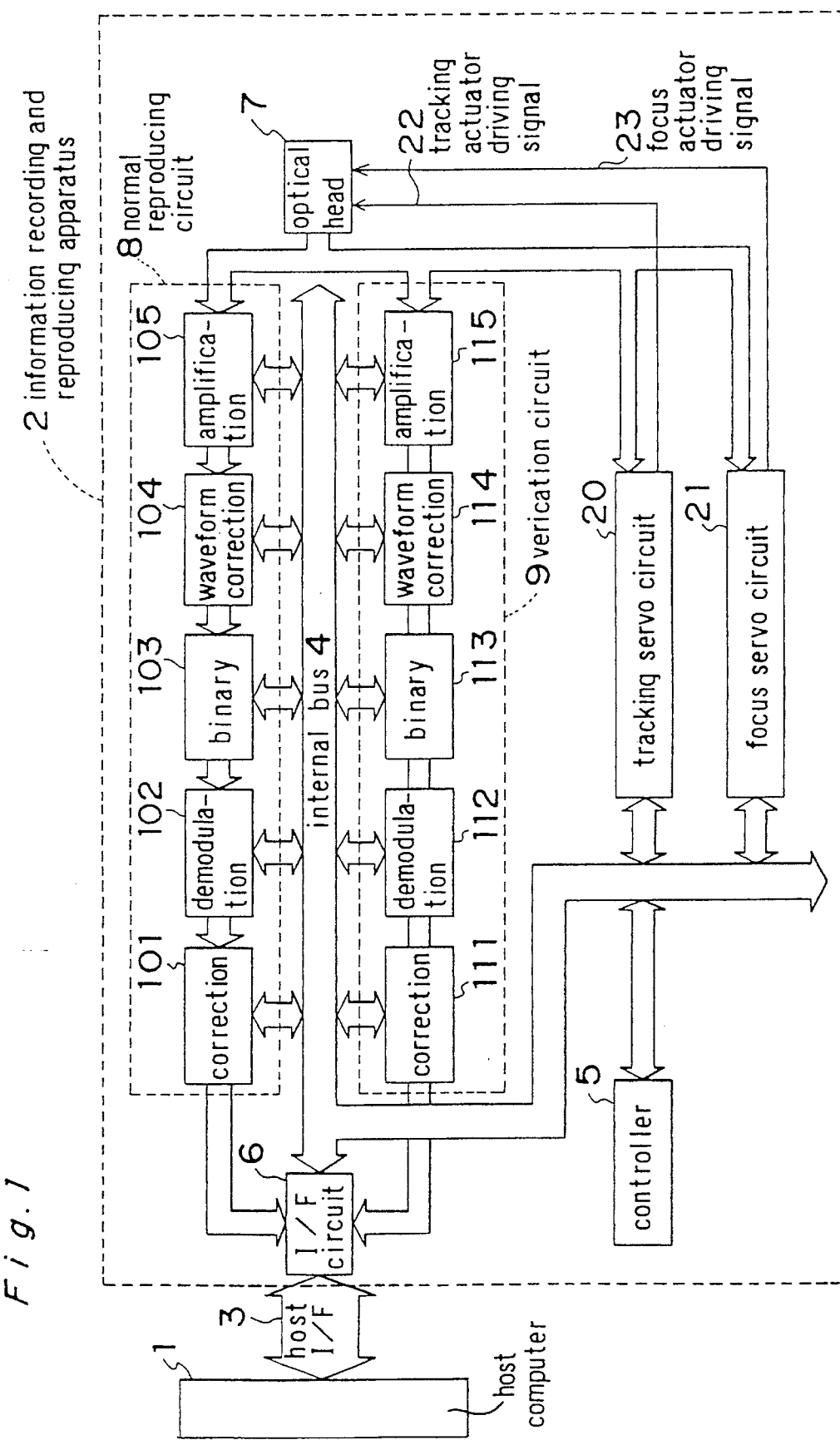
FIG. 1 is a block diagram of an optical information recording and reproducing apparatus in a first embodiment of the present invention.

Before the description of the present invention proceeds, it is to be noted that like parts are designated by like reference numerals throughout the accompanying drawings.

A first embodiment of the optical information recording and reproducing apparatus of the present invention will be described with reference to the drawings.

FIG. 1 is a block diagram showing one example of a first embodiment of the present invention. In FIG. 1, reference numeral 1 is a host computer, reference numeral 2 is an optical information recording and reproducing apparatus, reference numeral 3 is a host interface bus (hereinafter referred to as I/F), reference numeral 4 is an internal bus, reference numeral 5 is a controller for controlling the whole optical information recording and reproducing apparatus 2, reference numeral 6 is an interface circuit (hereinafter referred to as IIF circuit), reference numeral 7 is an optical head, reference numeral 8 is a normal reproducing circuit, reference numeral 9 is a verifying, reproducing circuit, reference numeral 20 is a tracking servo circuit, reference numeral 21 is a focus servo circuit, reference numeral 22 is a tracking actuator driving signal for driving so that the tracking servo circuit 20 follows the optical head 7 into a track, reference numeral 23 is a focus actuator driving signal to drive the focus servo circuit 21 to focus the optical head 7 on the track. The normal reproducing circuit 8 is composed of a correcting circuit 101, a demodulating circuit 102, a decision device 103, an equalizer circuit 104, and an amplifier circuit 105. The verifying, reproducing circuit 9 is composed of a correcting circuit 111, a demodulating circuit 112, a decision device 113, an equalizer circuit 114, and an amplifier circuit 115. A controller 5 controls each circuit through an internal bus 4. The normal reproducing circuit 8 and the verifying, reproducing circuit 9 clarify the difference with the description of the circuit of each construction element to be described. The I/F circuit 6 transfers to the host computer 1 the signal received from the optical head 7. The controller 5 transfers to the host computer 1 the data recorded on the sector of the information recording medium with the use of the normal reproducing circuit 8. The signals recorded on the information recording medium are converted into electric signals by the optical head 7 and are provided to the amplifier circuit 105, a tracking servo circuit 20 and a focus servo circuit 21. The tracking servo circuit 20 receives the tracking error signal from the signal of the optical head 7 to control the tracking actuator driving signal 22 so that the optical head 7 may follow the track.

The focus servo circuit 21 receives the focus error signal from the signal of the optical head 7 as the tracking servo circuit 20 to control the focus actuator driving signal 23 so that the focus of the optical head 7 may be adjusted onto the recording face. The amplifier circuit 105 amplifies the signal received from the optical circuit 7 to a proper amplitude. The equalizer circuit 104 corrects narrowly the width of the peak for easier discrimination between the peak of the signal received from the amplifier circuit 105 and an adjacent peak. The decision device 103 generates the pulse signal showing the peak position of the signal received from the equalizer circuit 104. The demodulating circuit 102 demodulates the position information of the sector from the pulse signal showing the peak position of the decision device 103 and demodulates the data of the sector when the present sector conforms to the object sector. The correcting circuit 101 performs the error correction on the data demodulated by the demodulator 102 to generate the errorless data. The I/F circuit 6 receives the corrected data from the correction circuit 101, and transfers the reproduction data to the host computer 1 through the host IIF bus 3.

The controller 5 can have the normal reproducing circuit 8 and the verifying, reproducing circuit 9 operate at the same time or have the normal reproducing circuit 8 and the verifying, reproducing circuit 9 operate separately. The controller 5 can reproduce the same sector at the same time using the normal reproducing circuit 8 and the verifying, reproducing circuit 9 in accordance with the normal reproduction instruction (READ command of the SCSI) from the host computer 1. The controller confirms whether or not the reproduction processing operation has succeeded by the normal reproducing circuit 8 and the verifying, reproducing circuit 9. When the reproduction processing operation has succeeded using both the reproducing circuits, the controller 5 hands over the reproduction data from the normal reproducing circuit 8 or the verifying, reproducing circuit 9 to the I/F circuit 6 so that the reproducing data may be transferred to the host computer 1. When only one reproducing circuit has succeeded in the reproduction processing operation, the controller provides the reproducing data from the successful reproducing circuit to the I/F circuit 6 to transfer the reproducing data to the host computer 1 and also to control so that the recovered operation may be reported. The controlling operation by the controller 5, including a case where both the reproducing circuits have failed in the reproduction processing operation, will be described later in detail with the use of the flow chart.

The respective circuits for composing the normal reproducing circuit 8 and the verifying, reproducing circuit 9 are described hereinafter.

The correcting circuits 101 and 111 are circuits for effecting an error-correcting operation suitable for the JIS X 6271 (136 mm optical disk) standard and ISO 10090 3rd DP (90 mm optical disk) being standardized at present.

In a sector format of 512 bytes of user data of, for example, the ISO 10090, an 80 byte error correcting code is added and is interleaved in five data rows. Errors of 8 bytes which the maximum number of bits which can be corrected by the provision of 16 bytes of error correction codes for each interleaving operation. Assume that the correcting circuits 101 and 111 can be set in the error correcting byte number per interleaving operation. The controller 5 is set to effect error corrections of up to 8 bytes for the correcting circuit 101 of the normal reproducing circuit 8 and is set so as to effect error corrections of up to 3 bytes for the correcting circuit 111 of the verifying, reproducing circuit 9.

Figure 2:
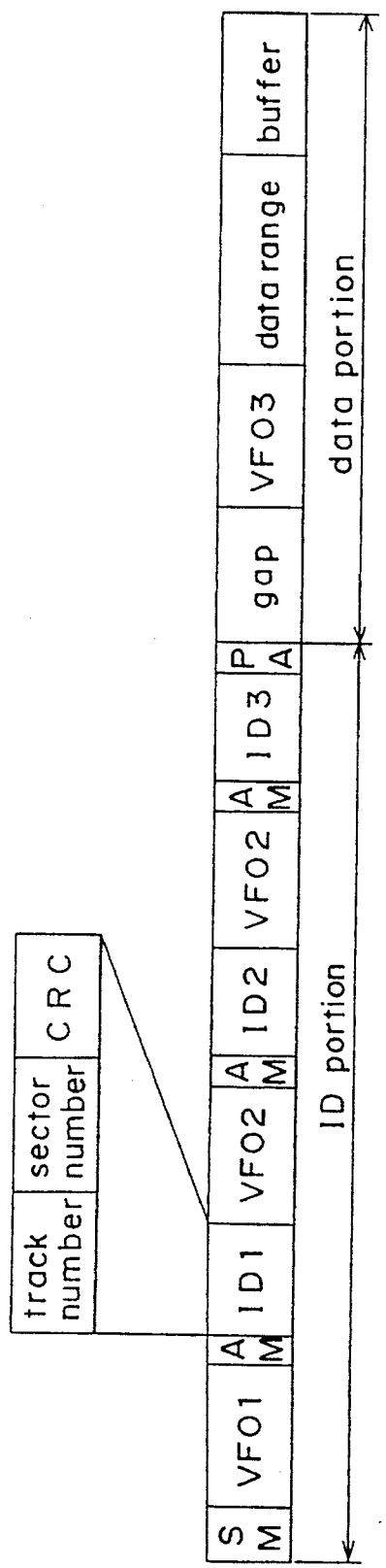
FIG. 2 is a sector format diagram of an ISO 10090.

The decode circuits 102 and 112 are circuits for detecting the sector format suitable for the JIS X 271 and the ISO 10090 to decode the data. FIG. 2 is a diagram showing the sector format of the 512 bytes of user data of the ISO 10090. One sector is largely composed of an ID portion and a data portion. Reference character SM is a sector mark showing the head of a sector. Synchronizing signals are recorded on VF01, 2, 3. Reference character AM is an address mark showing the head of the ID information.

Reference characters 1D1, 2, 3 are ID information and composed of a track number, a sector number and a circled reduction code (CRC'). Reference character PA is adapted to begin with a gap or a buffer. The gap is a region for effecting the power adjustment for the laser. User data and error correcting codes are recorded on the data region. The buffer provides room with respect to the timing shift caused from the rotation error of the information recording medium. As is clear from FIG. 2, ID information with positions for the sectors being described on it are recorded on multiplexed portions in three locations.

It is assumed that decode circuits 102 and 112 can select, as the detecting conditions of the sector, whether or not the ID has been detected by one of three ID information and whether the ID has been detected by two or more ID information. Sector detection is set by the controller 5 if the ID can be detected by at least one in the decode circuit 102 of the normal reproducing circuit 8, and if the ID can be detected by two or more in the decode circuit 112 of the verifying, reproducing circuit 9.

Figure 3:
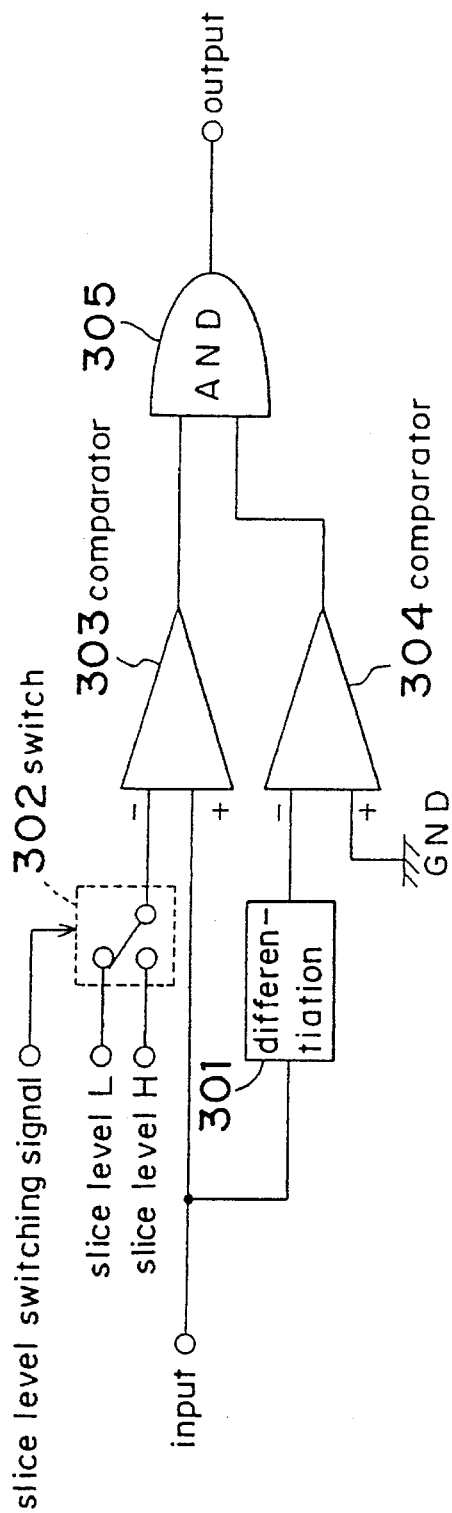
FIG. 3 is a decision device diagram of the optical information recording and reproducing apparatus in the first embodiment of the present invention.

Decision devices 103 and 113 are respectively for obtaining peak positions of the signal received from the equalizer circuits 104 and 114. The operations of the decision devices 103 and 113 will be described hereinafter with reference to the drawings. FIG. 3 shows the circuit diagrams of the decision devices 103 and 113. Reference numeral 301 is a differential circuit, reference numeral 302 is a switch for switching a slice level (e.g. the binary slice level), reference numerals 303 and 304 are comparators, and reference numeral 305 is a logical AND. The input signal of the decision device is differentiated by a differential circuit 301, compared with ground 0 by a comparator 304 and provided to a logical AND 305. When the input signal is smaller than the ground 0, 1 is inputted to the logical AND 30. The input signal of the decision device is also provided to the comparator 303, and compared with the slice level selected by the switch 302 controlled with the slice level switching signal so that 1 is inputted into the logical AND 305 when the input signal is larger than the slice level. The AND circuit 305 outputs 1 when both the inputted signals are 1 and it becomes the output of the decision device. The decision devices 103 and 113 are decision devices which can select the slide level. Assume that the slice level L is 50% of the signal amplitude and the slice level H is 60% of the signal amplitude as the slice level is provided to switch 302. The controller S sets the slice level L in the decision device 103 of the normal reproducing circuit 8 with the use of the slice level switching signal, and a slice level H in the decision circuit 113 of the verifying, reproducing circuit 9.

Figure 4:
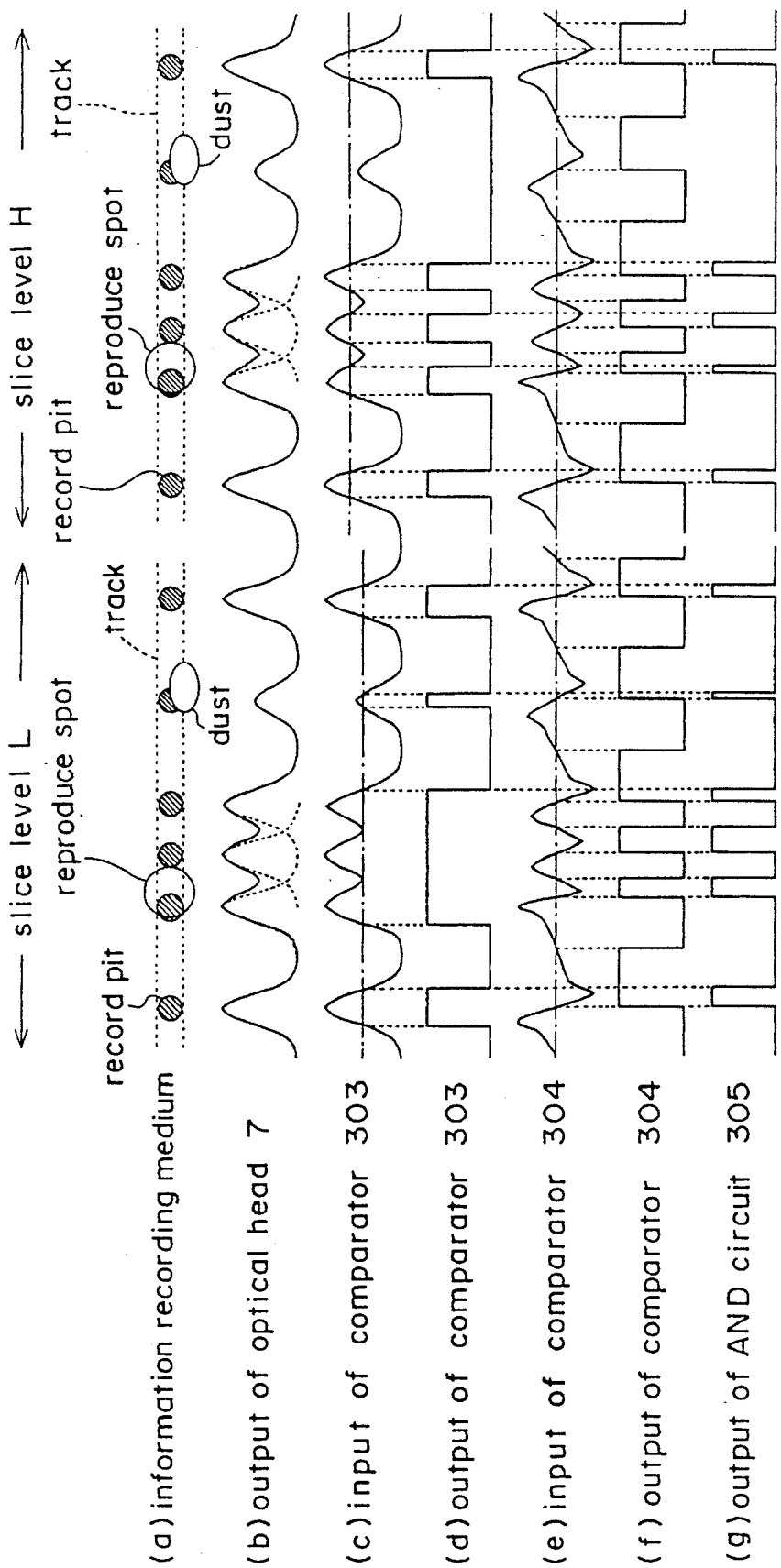
FIG. 4 shows various signal wave form charts when the slide level of the decision device of the optical information recording and reproducing apparatus in one embodiment of the present invention is changed.

FIG. 4 is the wave form charts of various signals of the decision devices 103 and 113 prepared for the description of the changes in the signals to be reproduced from the information recording medium by setting of the different slice level in the decision devices 103 and 113.

In FIG. 4, the left-hand side view shows the wave form of the decision device 103 where the slice level L of the comparatively low value is set, and the right-hand side view shows the wave form of the decision device 113 where the slice level H of the comparatively high value is set. For ease of description, it is assumed that the correction of the wave form is not effected in the equalizer circuits 104 and 114 so that the same signal wave forms may be inputted into both decision devices.

FIG. 4, line (a) shows a chart showing the positional relation among a signal recorded on the information recording medium and attached dust and reduction spots. FIG. 4, line (b) is an output signal from the optical head 7. FIG. 4, line (c) shows an input signal (solid line) and a slice level (one dot chain line) of the comparator 303 of the decision device. FIG. 4, line (d) is an output signal of a comparator 303 of the decision device. FIG. 4, line (e) is an output signal (solid line) of the differential circuit 301 of the decision device and a ground 0 level (one dot chain line). FIG. 4, line (f) is an output signal of the comparator of the decision circuit. FIG. 4, line (g) is an output signal of a logical AND 305 of the decision device. The amplitude of the output signal (FIG. 4, line (b)) of the optical head 7 becomes smaller, corresponding to the recording pit with dust being attached thereto in FIG. 4, line (a).

The correct peak positions are detected (on the left-hand side of FIG. 4, line (g)) by the decision device 103 where the slice level L has a comparatively low value, but the correct peak positions are not detected (the right side of FIG. 4, line (g)) by the decision device 113 where the slice level H has a comparatively high value. Namely, when dust, uneven sensitivity of the information recording medium, injuries, and insufficient power at recording time, for example, reduce the signal amplitude, the verifying, reproducing circuit 9 having the decision device 113 where the slice level has been comparatively set larger can detect sensitively the deterioration of the reproducing condition as compared with the normal reproducing circuit 8.

The equalizer circuits 104 and 114 are respective circuits for narrowing the peak width of the signal received from the amplifying circuits 105 and 115. The operations of the equalizer circuits 104 and 114 will be described hereinafter with reference to the drawings.

Figure 5:
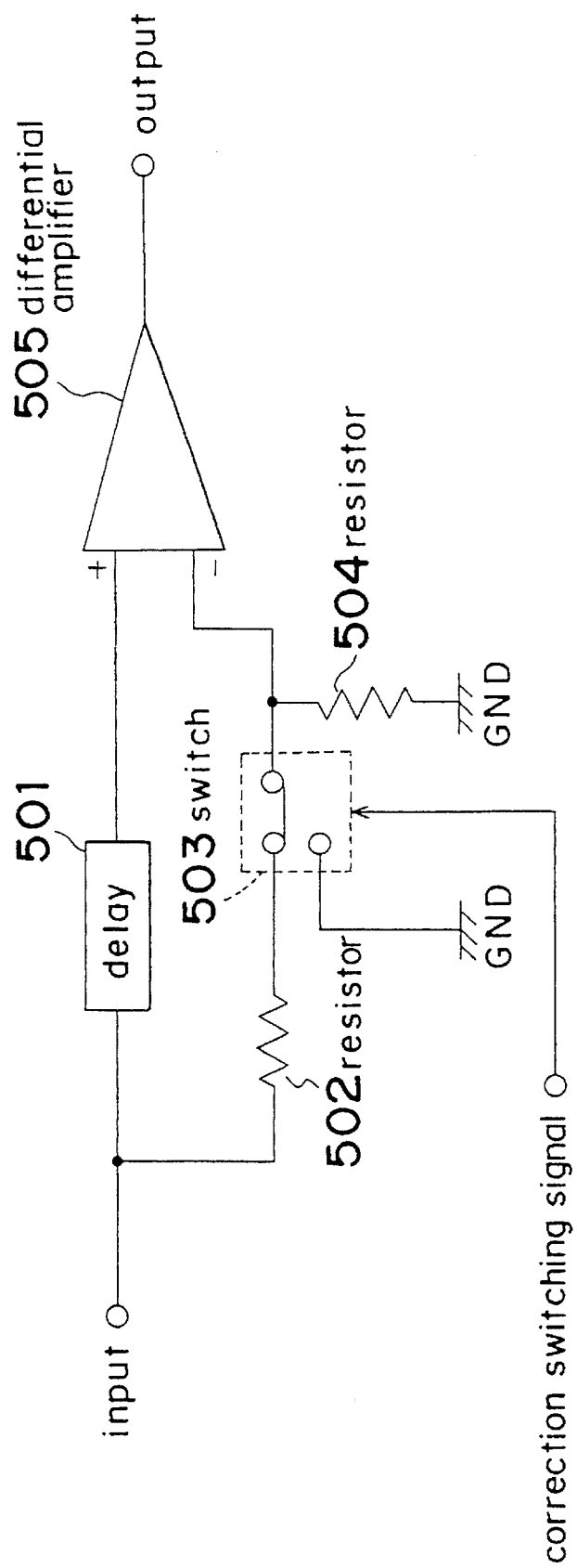
FIG. 5 is an equalizer circuit diagram of the optical information recording and reproducing apparatus in one embodiment of the present invention.

FIG. 5 is a circuit diagram of the equalizer circuits 104 and 114. In FIG. 5, reference numeral 501 is a delay circuit, reference numeral 502 is a resistor, reference numeral 503 is a switch, reference numeral 504 is a resistor, and reference numeral 505 is a differential amplifier. The input signals of the equalizer circuits 104 and 114 are delayed by the delay circuit 501 and inputted into the differential amplifier 505. The input signal of the equalizer circuit is also inputted into the differential amplifier 505 as a constant multiplication signal determined by resistor 502 and resistor 504 and switch 503 which is controlled by a correction switching signal. When the switch 503 in response to the equalizing switching signal has been connected to ground 0 (GND), the ground 0 is inputted into the differential amplifier 505. When the switch 503 is connected to the ground 0, the wave form correcting amount becomes 0 without the wave form correction being effected. When the switch 503 is connected to resistance 502, the wave form is equalized and the wave form equalizing amount (e.g. the equalizer quantity) becomes a value, which is not 0, to be determined using resistor 502 and resistor 503. The controller 5 sets the wave form equalizing amount to a value, not 0, in the equalizer circuit 114 of the normal reproducing circuit 8 and sets the wave form equalizing amount which becomes a value of 0 in the equalizing circuit 114 of the verifying, reproducing circuit 9.

Figure 6:
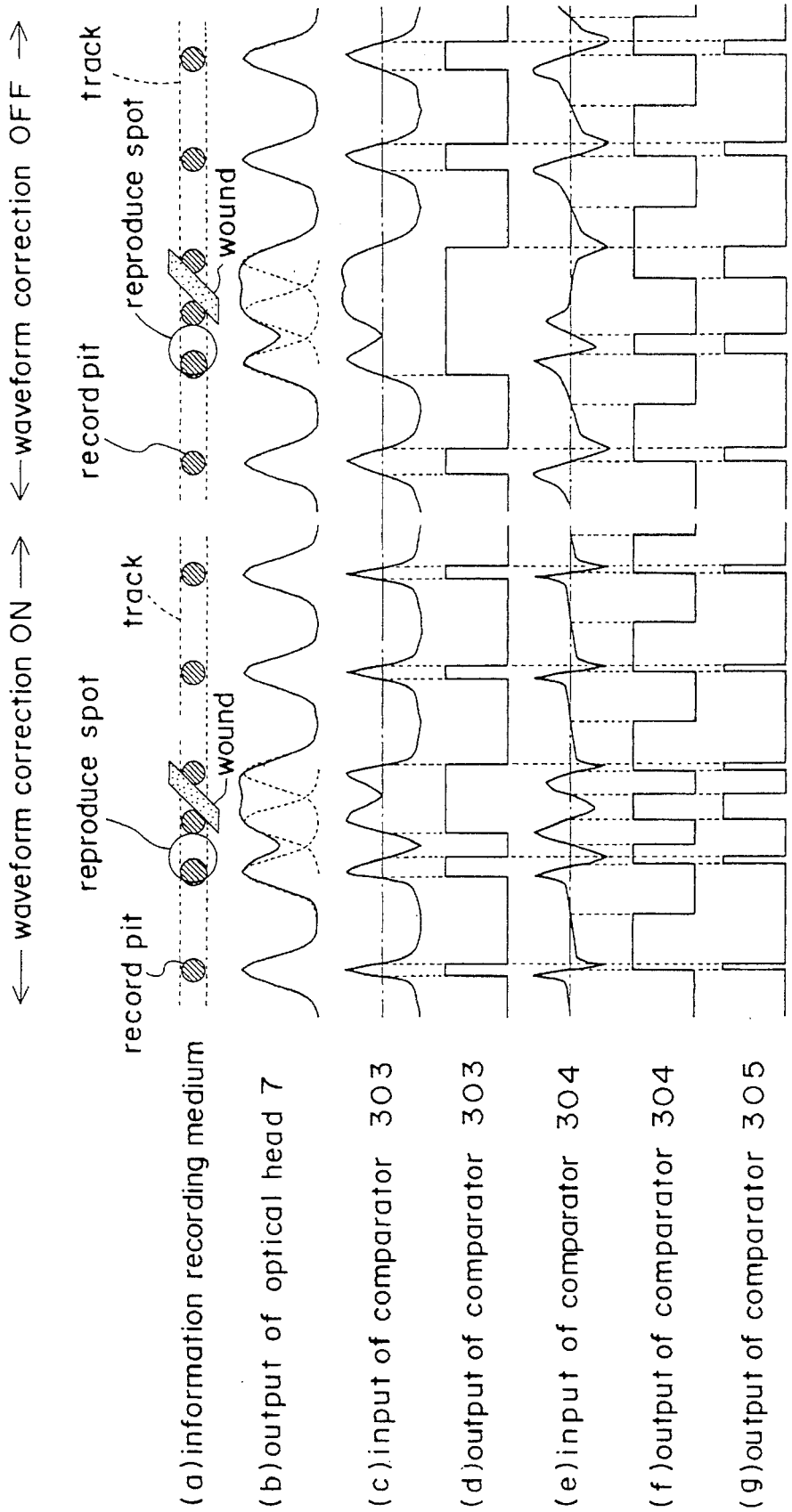
FIG. 6 shows various signal wave form charts when the wave form correcting amount of the equalizer circuit of the optical information recording and reproducing apparatus in first embodiment of the present invention is changed.

FIG. 6 shows wave form charts of the various signals of equalizer circuits 104, 114 and decision devices 103, 113' illustrating the change in the signals reproduced from the information recording medium by the setting operation of the wave for different correcting amounts from the equalizer circuits 104 and 114. In FIG. 6, the left-hand side view shows the wave forms when the wave form equalizing amount, other than 0, has been set, while the right-hand side view shows the wave form when the wave form equalizing amount has been set to 0. For ease of description, the slice level of any one of the decision devices is made the same.

FIG. 6, line (a) is a chart showing the positional relation among the signal recorded on the information recording medium, and the flaw and the reproduction spot on the information recording medium surface. FIG. 6, line (b) is an output signal from an optical head 7. FIG. 6, line (c) shows an input signal (solid line) and a slice level (one dot chain line) of a comparator 303 of a decision device which is also an output signal of the equalizer circuits 104 and 114. FIG. 6, line (d) is an output signal of the comparator 303 of the decision device. FIG. 6, line (e) shows an output signal (solid line) of the differential circuit 301 of the decision device and a ground 0 level (one dot chain line). FIG. 6, line (f) is an output signal of a comparator 304 of the decision device. FIG. 6, line (g) is an output signal of a logical AND 305 of the decision device.

The peak width of the output wave form (FIG. 6, line (b)) of the optical head 7 becomes thicker because of the flaws of the information recording medium surfaces in FIG. 6, line (a). As the peak width is corrected narrower in the output (on the left-hand side of FIG. 6, line (c)) of the equalizer circuit 104 where the wave form correcting amount is set, other than 0, the correct peak position is detected (on the left-hand side of FIG. 6, line (g)) in the subsequent decision device 103.

As the peak width is not modified at the output (right-hand side of FIG. 6, line (c)) of the equalizer circuit 114 where the wave form equalizing amount is set to 0, the correct peak position is not detected (the right-hand side of FIG. 6, line (g)) in the subsequent decision device 113. When situations such as dust, uneven sensitivity of information recording medium, flaws, and excess power at the recording time, make the peak width thicker, the verifying, reproducing circuit 9 having an equalizer circuit 114 where the wave form correcting amount is improperly set, can detect the deterioration of the reproducing condition with more sensitivity than the normal reproducing circuit 8.

For example, consider the case where a proper amplification factor is set in the amplifier circuit 105 of the normal reproducing circuit 8 and an amplification factor is improperly set lower in the amplifier circuit 115 of the verifying, reproducing circuit 9. In this case, the signal from the amplifier circuit 115 becomes smaller and is likely influenced by noise. Particularly, when such a situation makes the signal smaller from the recording pit of the information recording medium, the noise is hard to distinguish from the reproducing signals and the deterioration of the reproducing condition can be detected with sensitivity.

Figure 7:
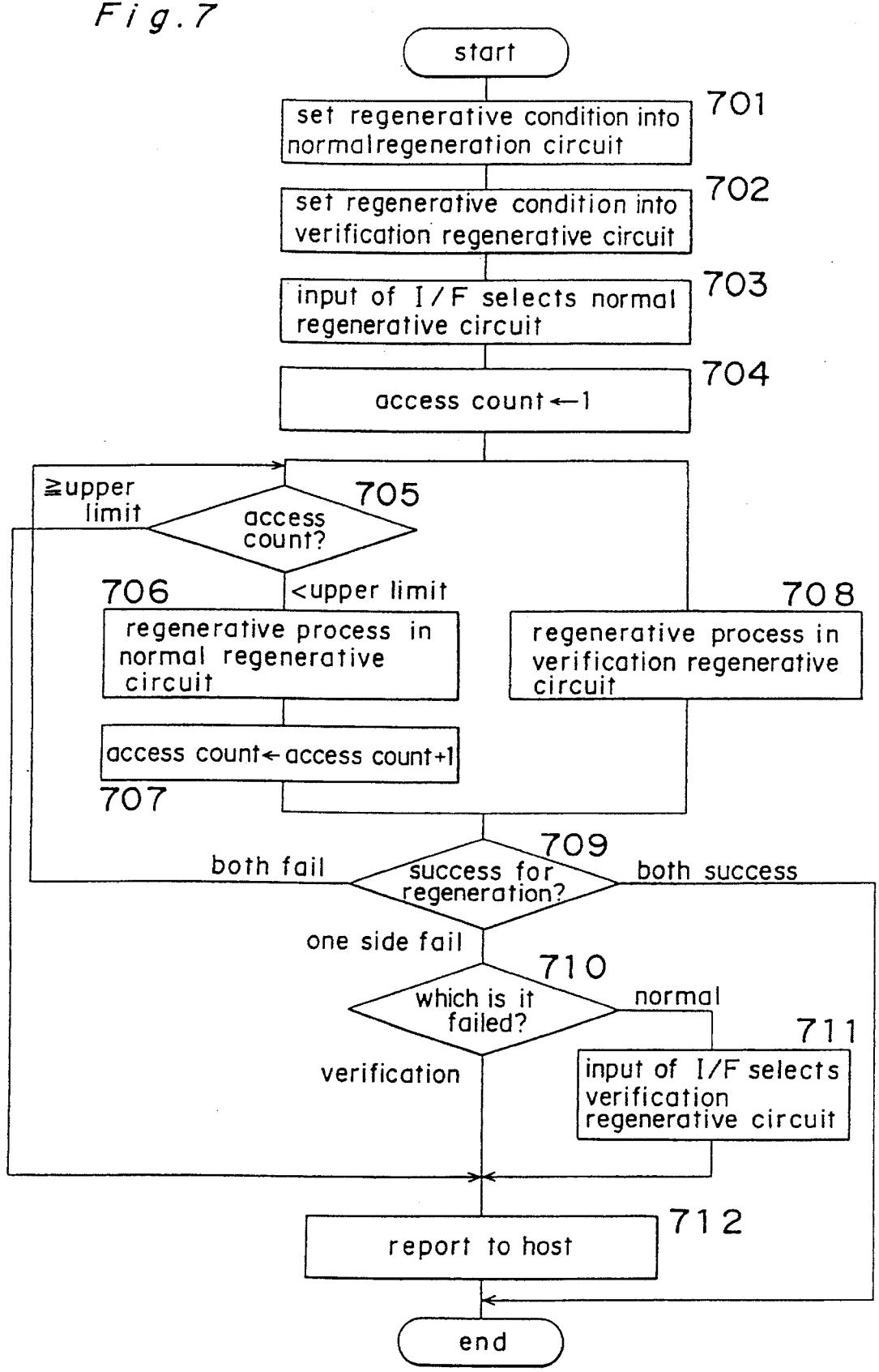
FIG. 7 is a flow chart showing the controlling operation of the controller of the optical information recording and reproducing apparatus in one embodiment of the present invention.

FIG. 7 is a flow chart showing the reproducing control including the retry operation when the controller 5 has received the normal reproducing instruction (READ command of the SCSI) from the host computer 1 in the optical information recording and reproducing apparatus in the first embodiment of the preset invention.

At step (701), the reproducing conditions having the highest possibility for successfully performing the reproducing operation are set in the normal reproducing circuit 8.

At step (702), the reproducing conditions are set in the verifying, reproducing circuit 9 when a sector is detected where a successful reproducing operation possible can not be performed for the sector in the near future.

At step (703), the output of the normal reproducing circuit 8 is selected as the input of the I/F circuit 6.

At step (704), an access frequency with respect to a target sector is initialized and set to a first time.

In the first time access, steps (705) through (707) and (708) are carried out at the same time.

At step (705), it is confirmed whether or not the access count exceeds the retry count. When the access count does not exceed the maximum retry count, step (706) is performed next and when the access count exceeds the maximum retry count, step (712) is performed next.

At step (706), a reproduction processing operation is effected with the normal reproducing circuit 8 with respect to a target sector.

At step (707), an access count is added by one.

At step (708), a reproduction processing operation is effected with the verifying, reproducing circuit 9 with respect to the target sector.

At step (709), it is confirmed whether or not the reproduction processing operation has succeeded with the normal reproducing circuit 8 and the verifying, reproducing circuit 9. The processing operation is completed when the reproducing operation has succeeded with both the circuits. When a single circuit has failed, step (710) is performed next. When both the circuits have failed, it returns to step (705) for the retry.

At step (710), it is confirmed which of the normal reproducing circuit 8 and the verifying, reproducing circuit 9 has failed.

When the verifying, reproducing circuit 9 has failed, the branching operation goes to step (712). When the normal reproducing circuit 8 has failed, the branching operation goes to step (711).

At step (711), in order to forward to the host computer 1 the data that the verifying, reproducing circuit 9 could reproduce, the input of the I/F circuit 6 is switched to the output of the verifying, reproducing circuit 9.

At step (712), it is (a) reported to the host computer 1 that the retry has been applied or (b) because of a condition where the data of the information recording medium are hard to reproduce, it is reported to the host computer 1 that the reproducing operation has failed even if the retry was performed.

The top limit of the correction byte number of the correcting circuits 101 and 111, the sector detecting conditions of the decode circuits 102 and 112, the slice levels of the decision devices 103 and 113, the wave form equalizing amount of the equalizer circuits 104 and 114, and the amplification factors of the amplifier circuits 105 and 115 are set as the reproducing conditions. One of the above described reproducing conditions or two or more of the above described reproducing conditions may be set differently in the normal reproducing circuit 8 than in the verifying, reproducing circuit 9.

If the top limits of the correction byte numbers of the correcting circuits 101 and 111 are respectively C1 and C2, the condition of C1>C2 needs only to be satisfied to set the conditions of the normal reproducing circuit 8 and the verifying, reproducing circuit 9 differently. 8 bytes and 3 bytes are set per interleaving operation respectively in the correcting circuits 101 and 111. This is one example where the condition of the C1>C2 is satisfied.

If the ID number necessary for the sector detection are respectively set I1 and I2 as the sector detecting conditions of the decoding circuits 102 and 112, the condition of I1<I2 needs only to be satisfied to set the conditions of the normal reproducing circuit 8 and the verifying, reproducing circuit 9 differently. This is accomplished by respectively setting 1ID and 2ID in the decoding circuits 102 and 112.

This is one example where the condition of I1 I2 is satisfied.

If the slice level of the decision devices 103 and 113 are respectively S1 and S2, the condition of S1≠S2 need only be satisfied to set the conditions of the normal reproducing circuit 8 and the verifying, reproducing circuit 9 differently. For example, if 50% and 60% of the amplitude are respectively set in the decision devices 103 and 113, the condition of S1≠S2 is satisfied.

Assume that the equalizer amount of the equalizer circuits 104 and 114 are respectively E1 and E2, the condition of E1≠E2 need only to be satisfied to set the conditions of the normal reproducing circuit 8 and the verifying, reproducing circuit 9 differently.

If the amplitude index of the amplifier circuits 105 and 115 are respectively A1 and A2, the condition of A1≠A2 need only to be satisfied to set the conditions of the normal reproducing circuit 8 and the verifying, reproducing circuit 9 differently.

In order to report to the host computer that the successful reproducing operation has been effected by the retry, an error code of "RECOVERED ERROR" is prepared by SCSI using the host interface.

The optical information recording and reproducing apparatus, and a method thereof in a first embodiment of the present invention can report that correct data of the sector can be forwarded to the host and also, the data of the sector possibly cannot be reproduced in the near future when the verifying, reproducing circuit 9 uses stricter reproducing conditions than the normal reproducing circuit 8 and only one of (a) the normal reproducing circuit 8 and (b) the verifying, reproducing circuit 9 can reproduce the data in the sector successfully.

A second embodiment of the optical information recording and reproducing apparatus of the present invention is described hereinafter with reference to the drawings.

Figure 8:
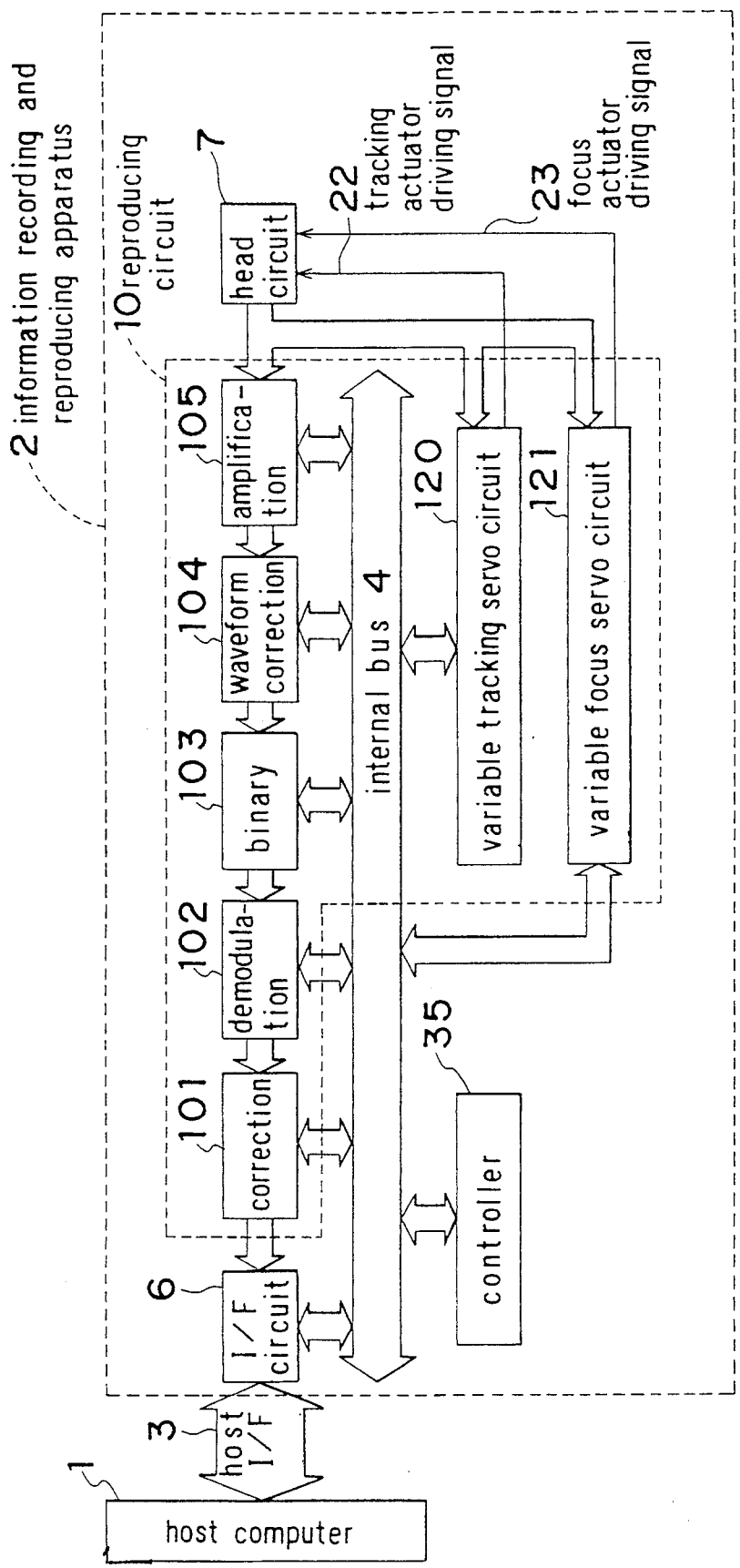
FIG. 8 is a block diagram of an optical information recording and reproducing apparatus in a second embodiment of the present invention.

FIG. 8 is a block diagram showing one construction example of the second embodiment of the present invention.

The same components as described above for the first embodiment of the present invention are designated in FIG. 8 by the same reference numbers, and thus, their detailed description is omitted. The different components in FIG. 8 from the first embodiment are reproducing circuit 10 having a variable tracking servo circuit 120 capable of adjusting the off-track amount, variable focusing servo circuit 121 capable of adjusting the defocus amount, and controller 35 which controls the off-track amount or the defocus amount as one method for making the reproducing conditions stricter in the verification reproduction. In addition, the second embodiment performs differently (a) the reproducing operation using the strict reproducing conditions as described above when the reproducing command of the verification from the host computer has been received, (b) the reproducing operation using the same strict reproducing conditions during verification for the first time when each sector is reproduced when the normal reproducing command has been received, (c) the reproducing operation for the second and subsequent times for the same sector when it is reproduced using the normal reproducing conditions when the reproducing operation has failed, and (d) reporting the recovered operation to the host computer when the data could be reproduced successfully using the normal reproducing conditions.

How the signal to be reproduced from the information recording medium is changed by controlling the off-track amount using the variable tracking servo circuit 120 will be described hereinafter with reference to the drawings.

Figure 9:
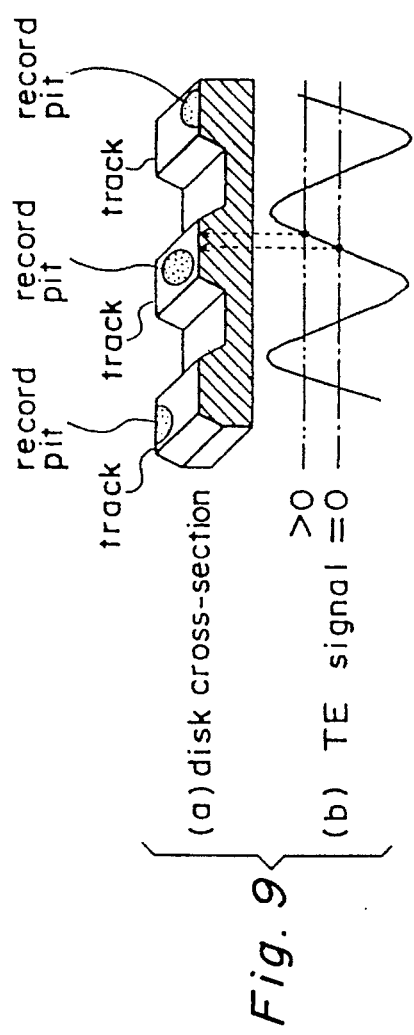
FIG. 9 is a relation view of off-track amount and tracking error signal of the variable tracking servo circuit of the optical information recording and reproducing apparatus in the second embodiment of the present invention.

FIG. 9 is a view showing the relationship between the off-track amount and the tracking servo signal of the variable tracking servo circuit 120 of the optical information recording and reproducing apparatus in the second embodiment of the present embodiment. FIG. 9, part (a) is a sectional view of the information recording medium and FIG. 9, part (b) is a tracking error signal. In FIG. 9, part (a), a guide groove is formed as tracks in the information recording medium, and recording pits are recorded on the information recording medium between guide grooves. The controlling operation keeps the optical spot at the center of the recording pit for the reproduction of the data. A push-pull method is generally known for generating the tracking error signal described in FIG. 9, part (b). The push-pull method, which is called a far-field method, determines the tracking error signals from the output difference in two light receiving portions disposed symmetrically around the track using light reflected, diffracted by the information recording medium shaped guide grooves. The far field method is described in detail in other documents such as "Optical Disc Art" or the like published by, for example, a radio technology company. In FIG. 9, part (b), the dot where the tracking error signal (solid line) crosses the ground 0 (one dot chain line) is the center of the track. Assume that the cross point with respect to the ground 0 is a target position of the servo, and the optical spot follows the track center.

A dot crossing the ground, indicated by the dashed line except for ground 0, designates a position shifted slightly from the track center. Suppose the crossing point except for ground 0 is a target position of the servo, and the position is shifted from the center of the track following an off-tracked position.

Figure 10:
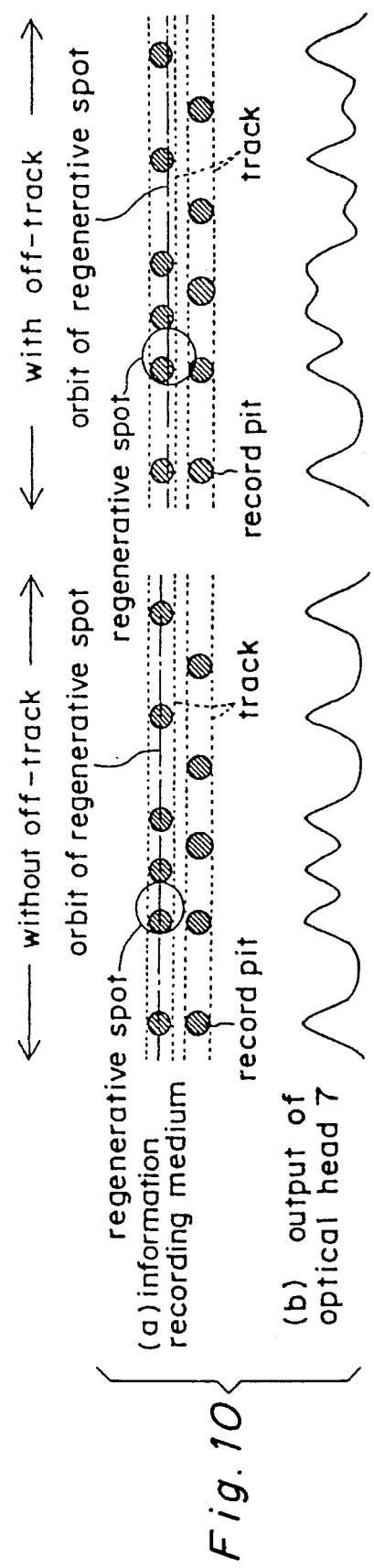
FIG. 10 is an output signal view of an optical head when the off-track amount of a variable tracking servo circuit of the optical information recording and reproducing apparatus in the second embodiment of the present invention.

FIG. 10 is a wave form chart of a signal provided for the description of the change in the signal to be reproduced from the information recording medium by setting the off-track amount differently using the variable tracking servo circuit 120. In FIG. 10, the left-hand side view shows the wave forms in a case where the off-track amount is set at 0. The right-hand side view shows the wave forms where the the off-track amount is set at other than 0. FIG. 10, line (a) is a view showing the positional relation between the signal and the reproducing spot recorded on the track to be followed and its adjacent track. FIG. 10, line (b) is the output signal from the optical head 7. When the off-track amount is set at other than 0, influences resulting from the recording pits of the adjacent track become larger. The influences of the adjacent recording pits appear as noise in the output wave form (FIG. 10, line (b)) of the optical head 7. The deterioration of the reproducing condition can be detected with sensitivity if the off-track amount is set at other than 0 using the fluctuation amount. The flaw on the adjacent track caused when the recording pits were recorded effects the fluctuating operation slightly around the track.

How the signal to be reproduced from the information recording medium is changed using the controlling operation of the defocus amount by the variable focusing servo circuit 121 will be described hereinafter with reference to the drawings.

The defocus amount can be set with the focusing error signal used in the adjusting operation of the off-track amount.

A knife-edge method is generally known to generate the focus error signal. The method is described in other literature such as "Optical Disc Art" published by the radio art company.

Figure 11:
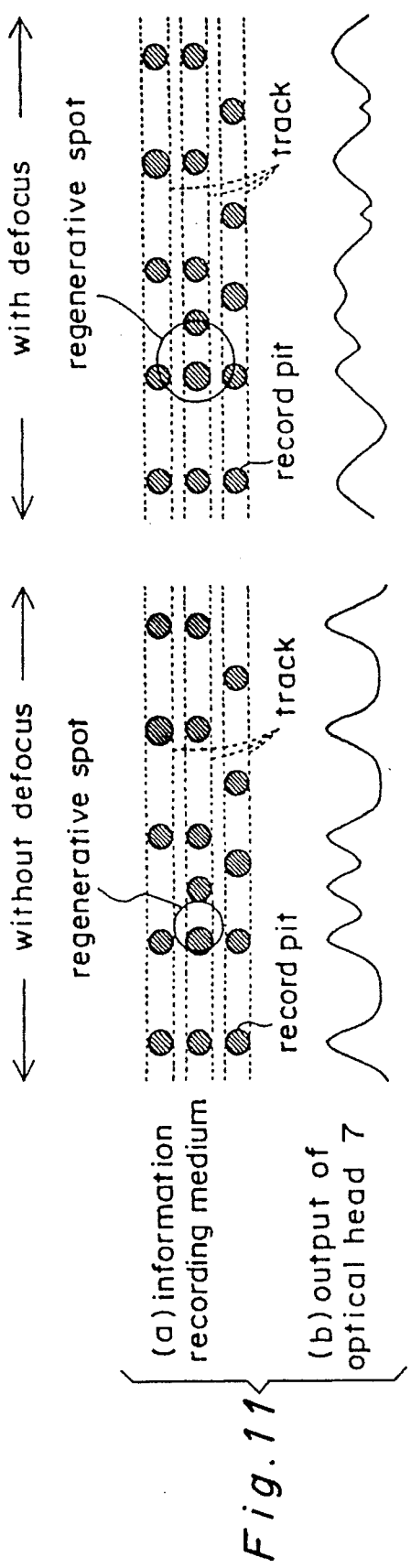
FIG. 11 is an output signal view of an optical head when the defocus amount of the variable focussing servo circuit of the optical information recording and reproducing apparatus in the second embodiment of the present invention is changed.

FIG. 11 includes wave form charts illustrating the changes in signals to be reproduced from the information recording medium by the setting of the different defocus amount in the variable focusing servo circuit 121.

In FIG. 11, the left-hand side drawing shows the wave form in a case where the defocus amount 0 is set. The right-hand side drawing shows the wave form where the defocus amount is set at other than 0. FIG. 11, line (a) is a view showing the positional relation between the signals to be recorded on the track to be followed, its adjacent tracks, and the reproduction spots. FIG. 11, line (b) is the output signal from the optical head 7. As the focussed optical spot is spread, where the defocus amount is set at other than 0, the influences of the adjacent recording pit of the current track and the recording pit of the adjacent track become larger. The influences of the adjacent recording pit appear as noise in the output wave form (FIG. 11, line (b)) of the optical head 7. The deterioration of the reproducing condition can be detected with sensitivity if the defocus amount is set at other than 0 with respect to (a) the fluctuation amount or (b) the fluctuated amount in the period of the recording pit by the rotation error of the information recording medium or the flaw when the fluctuating operation is being effected slightly around the track by the recording pits.

Figure 12:
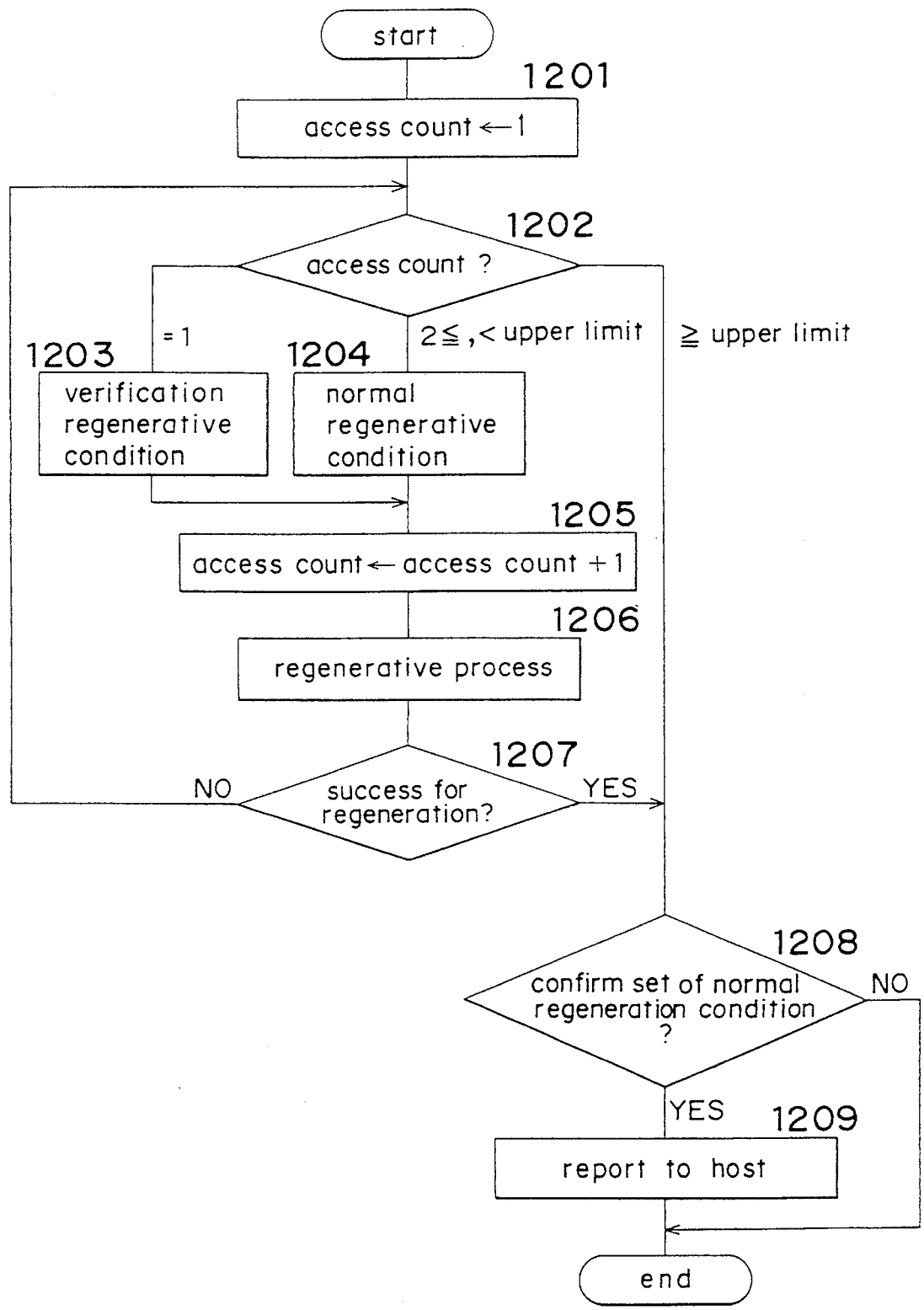
FIG. 12 is a flow chart showing the controlling operation of the controller of the optical information recording and reproducing apparatus in the second embodiment of the present invention.

FIG. 12 is a flow chart showing the reproducing control including the retry operation where the controller 35 has received the normal reproducing instruction (READ command of SCSI) from the host computer 1 in the optical information recording and reproducing apparatus in a second embodiment of the present invention.

At step (1201), an access frequency with respect to a target sector is initialized and set to a first time.

At step (1202), it is confirmed whether or not the access frequency is at the first time or has exceeded the top limit of the retry frequency. In the first case, the branching operation goes to step (1203). When the access frequency does not exceed the top limit of the retry frequency, it goes to step (1204). When it exceeds the top limit of the retry frequency, it goes to step (1208).

At step (1203), the reproducing conditions for a sector which possible can not be reproduced in the near future is set in each circuit.

At step (1204), the reproducing conditions where the possibility of a successful reproducing operation is highest are set in each circuit.

At step (1205), the access frequency is added by one.

At step (1206), a reproduction processing operation is effected upon the target sector.

At step (1207), it is confirmed whether or not the reproduction processing operation has succeeded. When the reproduction processing operation has succeeded, the step goes to step (1208).

When the reproduction processing operation has failed, the step returns to step (1202) for the retry operation.

At step (1208), it is confirmed whether or not the reproducing conditions where the possibility of normal reproducing operation is the highest, have been set in the reproduction processing of the target sector. When the reproducing conditions are set, the step goes to step (1209). When they are not set, the processing operation is completed.

At step (1209), it is reported to the host computer 1 that the retry has been performed because the data from the information recording medium was hard to reproduce, or the data could not be reproduced when retried.

The top limit of the correction byte number of the correcting circuit 101, the sector detecting conditions of the decode circuit 102, the slice level of the decision device 103, the wave form correcting amount of the equalizer circuit 104, and the amplification factor of the amplification circuit 105 may be set as the reproduction conditions as in the first embodiment of the present invention. The off-track amount of the variable tracking servo circuit 120 and the defocusing amount of the variable focusing servo in the second embodiment of the present invention may also be set. One or more of the above described reproduction conditions may be set differently for verification reproduction and normal reproduction different.

When the top limit of the correction byte numbers of the correcting circuit 101 is set for the normal reproducing conditions and the verifying, reproducing conditions which are C1 and C2 respectively, the condition of C1>C2 need only be satisfied. 8 bytes and 3 bytes per interleaving are respectively set for C1 and C2. This is one example where the condition of C1>C2 is satisfied.

The condition of I1<I2 need only be satisfied if the ID numbers necessary for the sector detection are respectively I1 and I2 as the sector detection conditions of the decode circuits 102 and 112 to be set as the normal reproducing conditions and the verifying, reproducing conditions respectively. 1ID and 2ID are respectively set. This is one example where the condition of I1<I2 is satisfied.

The condition of S1≠S2 need only be satisfied if the slice levels of the decision devices 103 and 113 are set as the normal reproducing condition and the verifying, reproducing condition as respectively S1 and S2. 50% and 60% of the amplitude are set respectively. This is one example where the condition of the S1≠S2 is satisfied.

The condition of E1≠E2 need only be satisfied if the equalizing amount of the equalizer circuits 104 and 114 are respectively E1 and E2 for the normal reproducing condition and the verifying, reproducing condition.

The condition of |01|<|02| need only to be satisfied if the amplification indexes of the amplifier circuits 105 and 115 are respectively A1 and A2 as the normal reproducing condition and the verifying, reproducing condition.

The condition of |01|<|02| need only to be satisfied (|| is an absolute value) if the off track amount of the variable tracking servo circuit 120 is set respectively 01 and 02 as the normal reproducing condition and the verifying, reproducing condition. The 01 is set to zero. This is one example where the condition of [the] |01|<|02| is satisfied.

The condition of |D1|<|D2| need only to be satisfied (|| is an absolute value) if the defocus amount of the variable focus servo circuit 121 is set as D1 and D2 respectively for the normal reproducing condition and the verifying, reproducing condition. D1 is set to zero.

This is one example where the condition of the |D2|<|D2| is satisfied.

In order to report that the reproducing operation has been performed successfully by the retrial to the host computer, an error code of "RECOVERED ERROR" is prepared for an example of SCSI in the host interface.

In the optical information recording, reproducing apparatus and a method thereof in the second embodiment of the present invention, the off track amount and the defocus amount can be further changed from the above description as reproducing conditions to be set. When the reproducing instruction (VERIFY command of SCSI) for verification has been received from the host computer, the sector high has a possibility that it can not be reproduced in the near future. This is more efficiently detected by the setting operation, at other than 0 of (a) the off track amount, or (b) the defocus amount or (c) the off track amount and the defocus amount.

Although the present invention has been fully described by way of example with reference to the accompanying drawings, it is to be noted here that various changes and modifications will be apparent to those skilled in the art.

Therefore, unless such changes and modifications depart from the scope of the present invention, they should be construed as included therein.

What is claimed is:

1. An optical information recording and reproducing apparatus connected with a host computer, the optical information recording and reproducing apparatus for optically recording and reproducing data in a sector unit using an information recording medium, said apparatus comprising:

normal reproducing means for reproducing data recorded on the information recording medium using first reproducing conditions, verifying, reproducing means for reproducing the data recorded on the information recording medium using second reproducing conditions, said second reproducing conditions including stricter reproducing requirements than said first reproducing conditions, reproducing, controlling means for causing the normal reproducing means and the verifying, reproducing means to reproduce data from a same sector at a same time, and recovery reporting means for reporting a recovery effected of the data to a host computer when the data has been reproduced by one of (a) the normal reproducing means and (b) the verifying, reproducing means.

2. An optical information recording and reproducing apparatus described in accordance with claim 1, where the second reproducing conditions include a maximum of error correction byte numbers which is smaller than a maximum of error correction byte numbers in the first reproducing conditions.

3. An optical information recording and reproducing apparatus described in accordance with claim 1, where the second reproducing conditions include a larger number of sector position information necessary for a detection of a sector than a number of the sector position information in the first reproducing conditions.

4. An optical information recording and reproducing apparatus described in accordance with claim 1, where the second reproducing conditions are stricter than the first reproducing conditions because the second reproducing conditions include an equalization quantity different from the first reproducing conditions.

5. An optical information recording and reproducing apparatus described in accordance with claim 1, where the second reproducing conditions are stricter than the first reproducing conditions because the second reproducing conditions include a binary transition level different from a binary transition level in the first reproducing means.

6. An optical information recording and reproducing apparatus connected with a host computer, the optical information recording and reproducing apparatus for optically recording and reproducing data in a sector unit using an information recording medium, said apparatus comprising:

normal reproducing means for reproducing data recorded on the information recording medium using first reproducing conditions, verifying, reproducing means for reproducing the data recorded on the information recording medium using second reproducing conditions which are stricter than the first reproducing conditions, reproducing, controlling means for causing the verifying, reproducing means to reproduce data from a sector during a first time, and the normal reproducing means to reproduce data from the sector during subsequent times when the verifying, reproducing means has failed to reproduce the data in the sector, and a recovery reporting means for reporting a recovery effected of the data to a host computer when the data in the sector unit has been reproduced by the normal reproducing, controlling means.

7. An optical information recording and reproducing apparatus described in accordance with claim 6, where the second reproducing conditions include a smaller maximum of error correction byte numbers than a maximum of error correction byte numbers in the first reproducing conditions.

8. An optical information recording and reproducing apparatus described in accordance with claim 6, where the second reproducing conditions include a larger number of a sector position information necessary for detection of the sector than a number of the sector position information included in the first reproducing conditions.

9. An optical information recording and reproducing apparatus described in accordance with claim 6, where the second reproducing conditions are stricter because the second reproducing conditions include an equalization quantity different from an equalization quantity included in the first reproducing conditions.

10. An optical information recording and reproducing apparatus described in accordance with claim 6, where the second reproducing conditions are stricter because the second reproducing conditions include a binary transition level different from a binary transition in the first reproducing conditions.

11. An optical information recording and reproducing apparatus connected with a host computer, the optical information recording and reproducing apparatus for optically recording and reproducing data in a sector unit using an information recording medium, said information recording medium having a sector and a track, said apparatus comprising:

tracking servo means capable of adjusting an off-track quantity which is a slip off quantity from the center of the track, normal reproducing means for controlling an off-track quantity to reproduce data without using an off-track operation, verifying, reproducing means for controlling the off-track quantity to reproduce data using the off-track operation, reproducing, controlling means for causing the verifying reproducing means to reproduce data from the sector during a first time, and the normal reproducing means to reproduce the data from the sector during a subsequent time when the verifying, reproducing means failed to reproduce data during the first time, and recovery reporting means for reporting a recovery effected of data to the host computer when the data in the sector unit has been reproduced by the normal reproducing, controlling means.

12. An optical information recording and reproducing apparatus connected with a host computer, the optical information recording and reproducing apparatus for optically recording and reproducing data in a sector unit using an information recording medium having a recording face, said apparatus comprising:

a focus servo means for adjusting a defocus quantity which is a slip off quantity of a focus of an information recording medium with respect to the recording face, a normal reproducing means for controlling a defocusing quantity to reproduce data without a defocusing operation, verifying, reproducing means for controlling a defocus quantity to reproduce data with the defocusing operation, reproducing, controlling means for causing the verifying, reproducing means to reproduce data from the sector unit during a first time, and the normal reproducing means to reproduce data from the sector unit during subsequent times when the verifying, reproducing means has failed to reproduce the data in the sector unit, and recovery reporting means for reporting a recovery effected of data to the host computer when the data in the sector unit has been reproduced by the normal reproducing, controlling means.

13. An optical information recording and reproducing method for optically recording, reproducing data in a sector unit using an information recording medium with a command from a host computer comprising a first reproducing circuit and a second reproducing circuit for reproducing data using different reproducing conditions, said method comprising the steps of (a) setting normal reproduction conditions in the first reproducing circuit, (b) setting verifying, reproducing conditions stricter than the normal reproducing conditions in the second reproducing circuit, (c) causing the first reproducing circuit and the second reproducing circuit to reproduce data from a same sector at a same time, and (d) reporting a recovery effected of the data to the host computer when the data in the sector unit is reproduced by one of the first reproducing circuit and the second reproducing circuit.

14. An optical information recording and recording method described in claim 13, further comprising the steps of setting a smaller maximum of error correction byte numbers in the verifying, reproducing conditions as compared to a maximum of error correction byte numbers set in the normal reproducing conditions and setting the smaller maximum of the error correction byte numbers in the second reproducing circuit.

15. An optical information recording and reproducing method described in accordance with claim 13, further comprising the steps of setting a larger number of sector position information necessary for a detection of a sector in the verifying reproducing conditions as compared to a number of the sector position information in the normal reproducing conditions, and setting the larger number of the sector position information in the second reproducing circuit.

16. An optical information recording and reproducing method described in accordance with claim 13, further comprising a step of setting in the second reproducing circuit a first equalization quantity as one of the verifying, reproducing conditions which is different from a second equalization quantity set in the normal reproducing conditions.

17. An optical information recording and reproducing method described in accordance with claim 13, further comprising a step of setting in the second reproducing circuit a first binary transition level as one of the verifying, reproducing conditions which is different from a second binary transition level set in the normal reproducing conditions.

18. An optical information recording and reproducing method for optically recording, reproducing data in a sector unit using an information recording medium with a command from a host computer including a reproducing circuit for reproducing the data using different reproducing conditions, said method comprising the steps of:

(a) setting verifying, reproducing conditions stricter than normal reproducing conditions in the reproducing circuit during a first time when the data in the sector unit is reproduced, (b) setting the normal reproducing conditions in the reproducing circuit during subsequent times when the data in the sector is reproduced, (c) causing the reproducing circuit to perform a reproducing operation, and (d) reporting a recovery effected of the data from the sector unit when the reproducing circuit reproduces the data using one of the normal reproducing conditions and the verifying, reproducing conditions.

19. An optical information recording and recording method described in claim 18, further comprising the steps of setting a smaller maximum of an error correction byte number in the verifying, reproducing conditions as compared to a maximum of the first error correction byte number in the normal reproducing conditions, and setting the smaller maximum error correction byte number in the reproducing circuit during a first time.

20. An optical information recording and reproducing method described in accordance with claim 18, further comprising the steps of setting a first number of a sector position information necessary for a first detection of a sector in the verifying, reproducing conditions larger than a second number of the sector position information in the normal reproducing conditions, and setting the first error correction byte number in the reproducing circuit during a first time.

21. An optical information recording and reproducing method described in accordance with claim 18, further comprising a step of setting in the reproducing circuit a first equalization quantity in the verifying, reproducing conditions which is different from a second equalization quantity set in the normal reproducing conditions.

22. An optical information recording and reproducing method described in accordance with claim 18, further comprising a step of setting in the reproducing circuit a first binary transition level in the verifying, reproducing conditions which is different from a second transition slice level set in the normal reproducing conditions.

23. An optical information recording and reproducing method for optically recording, reproducing data in a sector unit using an information recording medium, a reproducing circuit having a focusing servo function for adjusting a defocus quantity which is a slip off quantity of a focus on the information recording medium with respect to a recording face, and a reproducing circuit, the method comprising the steps of:

(a) setting in the reproducing circuit the defocus quantity to control a defocus operation during reproduction, and (b) causing the reproducing circuit to reproduce the data from the information recording medium using the defocus quantity.

24. An optical information recording and reproducing method for optically recording, reproducing data in a sector unit using an information recording medium having a track and a host computer having a reproducing circuit including a tracking servo function for adjusting an off-track quantity which is a slip off quantity from the center of the track, said method comprising the steps of:

(a) setting as verifying, reproducing conditions with a predetermined first off-track quantity in the reproducing circuit when the reproducing circuit reproduces the data on the information recording medium from one sector unit for a first time, said first off-track quantity causing the reproducing circuit to reproduce the data along a predetermined amount off the center of the track determined by said first off-track quantity, (b) setting as normal reproducing conditions a predetermined second off-track quantity in the reproducing circuit when the reproducing circuit reproduces the data on the information recording medium from one sector unit for subsequent times, said second off-track quantity causing the reproducing circuit to reproduce data along the center of the track, wherein said predetermined first off-track quantity is larger than said predetermined second off-track quantity, (c) causing the reproducing circuit to perform a reproducing operation, and (d) reporting a recovery effected of data to the host computer when the reproducing circuit reproduces the data using one of the normal reproducing conditions and the verifying, reproducing conditions.

25. An optical information recording and reproducing method for optically recording, reproducing data in a sector unit using an information recording medium and a host computer having a reproducing circuit including a focusing servo function for adjusting a defocus quantity which is a slip off quantity of a focus of the information recording medium with respect to a recording face, said method comprising the steps of:

(a) setting as verifying, reproducing conditions with a predetermined first defocus quantity in the reproducing circuit when the reproducing circuit reproduces the data on the information recording medium from one sector unit for a first time, said first defocus quantity causing the reproducing circuit to reproduce the data under a predetermined first defocused condition determined by said first defocus quantity, (b) setting as normal reproducing conditions with a predetermined second defocus quantity in the reproducing circuit when the reproducing circuit reproduces the data on the information recording medium from one sector unit for subsequent times, said second defocus quantity causing the reproducing circuit to reproduce the data under a predetermined second defocused condition determined by said second defocus quantity, wherein said first defocus quantity is larger than said second defocus quantity, (c) causing the reproducing circuit to perform a reproducing operation, and (d) reporting a recovery effected of data when the reproducing circuit reproduces the data in the sector unit using one of the verifying reproducing conditions and the normal reproducing conditions.

* * * * *

UNITED STATES PATENT AND TRADE MARK OFFICE
CERTIFICATE OF CORRECTION

PATENT NO.   : 5,564,013
DATED        : October 8, 1996
INVENTOR(S)  : Ito et al.

It is certified that error appears in the above-identified patent and that said Letters Patent is hereby corrected as shown below:

On the cover page, item [56] References Cited, U.S. Patent Documents, 5,396,477 Matsumoto et al. should be dated --9/1989--.

In column 18, line 11, delete second occurrence of "recording" and insert therefor --reproducing--.

In column 18, line 62, delete second occurrence of "recording" and insert therefor --reproducing--.

Signed and Sealed this

First Day of April, 1997

Attest:

BRUCE LEHMAN

Attesting Officer

Commissioner of Patents and Trademarks